United States Patent
Takeda et al.

(10) Patent No.: US 9,519,367 B2
(45) Date of Patent: Dec. 13, 2016

(54) DISPLAY APPARATUS AND COMPUTER-READABLE NON-TRANSITORY RECORDING MEDIUM WITH DISPLAY CONTROL PROGRAM RECORDED THEREON

(71) Applicant: KYOCERA Document Solutions Inc., Osaka (JP)

(72) Inventors: Hideki Takeda, Osaka (JP); Takashi Namii, Osaka (JP); Yumi Hirobe, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 94 days.

(21) Appl. No.: 14/595,428

(22) Filed: Jan. 13, 2015

(65) Prior Publication Data

US 2015/0199040 A1   Jul. 16, 2015

(30) Foreign Application Priority Data

Jan. 15, 2014  (JP) ................................ 2014-005420

(51) Int. Cl.
*G06F 3/041* (2006.01)
*G06F 3/0488* (2013.01)
*G06F 3/0484* (2013.01)

(52) U.S. Cl.
CPC ........... *G06F 3/041* (2013.01); *G06F 3/04847* (2013.01); *G06F 3/04883* (2013.01); *G06F 2203/04104* (2013.01)

(58) Field of Classification Search
CPC  G06F 3/04886; G06F 3/04883; G06F 3/0488; G06F 3/044; G06F 3/04845; G06F 3/04815; G06F 3/0485; G06F 2203/04101; G06F 2203/04104; G06F 2203/04106; G06F 2203/04808; G06F 3/0235; G06F 3/041; G06F 3/0412; G06F 3/0416; G06F 3/0418
See application file for complete search history.

(56) References Cited

U.S. PATENT DOCUMENTS

| | | | | |
|---|---|---|---|---|
| 2006/0140602 A1* | 6/2006 | Kurata | ............... | H04N 5/23248 396/55 |
| 2007/0150830 A1* | 6/2007 | Ording | .................. | G06F 3/0481 715/784 |
| 2013/0097551 A1* | 4/2013 | Hogan | ................ | G06F 3/04847 715/780 |

FOREIGN PATENT DOCUMENTS

JP    2013-012060 A    1/2013

* cited by examiner

*Primary Examiner* — M D Saiful A Siddiqui
(74) *Attorney, Agent, or Firm* — IP Business Solutions, LLC (57) ABSTRACT

An information processing apparatus includes a display section, a touch panel, a movement information detecting section configured to detect a direction and an amount of movement from an initial point of an operator's touch of the touch panel to a stopping point thereof, a vector calculating section configured to calculate y- and x-component vectors from a vector indicated by the direction and amount of movement, an amount-of-value-change calculating section configured to calculate an amount of numerical value change at each numerical display switch from an amount of movement of the y-component vector, a switching speed calculating section configured to calculates a switching speed at each numerical display switch from an amount of movement of the x-component vector, and a display control section allowing the numerical display switch of the display section in the calculated amount of numerical value change at the calculated switching speed.

8 Claims, 10 Drawing Sheets

0→1→2→3→···→998→999→1000
AMOUNT OF NUMERICAL VALUE CHANGE

Fig.8B

0→2→4→6→···→996→998→1000
AMOUNT OF NUMERICAL VALUE CHANGE

DISPLAY APPARATUS AND COMPUTER-READABLE NON-TRANSITORY RECORDING MEDIUM WITH DISPLAY CONTROL PROGRAM RECORDED THEREON

INCORPORATION BY REFERENCE

This application claims priority to Japanese Patent Application No. 2014-5420 filed on Jan. 15, 2014, the entire contents of which are incorporated by reference herein.

BACKGROUND

The present disclosure relates to a display apparatus and a computer-readable non-transitory recording medium with a display control program recorded thereon and particularly relates to a technique for displaying one after another of numerical values on a display section.

Image forming apparatuses, mobile terminals such as smartphones, personal computers, and like devices and apparatuses display on their display section candidates for a setting value, which can be set by operators, for a function or the like operable on these devices and apparatuses and receive entry of a desired setting value using a touch panel function or the like through an operator's touch of a display screen. These devices and apparatuses switch a display of numerical values enterable as a setting value from one value to another in succession to enable the operator to readily select a desired setting value. For example, when, for enterable numerical values of 1 to 1000, the operator enters a command to switch the numerical display from one value to another in succession, the numerical values are displayed one after another in an amount of numerical value change of 1, like 1→2→3→ . . . →998→999→1000.

Furthermore, when during this successive display switches the operator is slow in selecting a value, the amount of numerical value change at subsequent display switches is increased. For example, when the operator is slow in selecting a value while the successive display switches are made in an amount of numerical value change of 1 in the above manner, the numerical values are displayed differently on the way, one after another in an amount of numerical value change of 10, like . . . →50→60→70→80→90→100→ . . . . Thus, a desired value to be selected by the operator can be reached quickly.

SUMMARY

A technique improved over the aforementioned technique is proposed as one aspect of the present disclosure.

A display apparatus according to an aspect of the present disclosure includes a display section, a display control section, an operating point detecting section, a movement information detecting section, a vector calculating section, an amount-of-value-change calculating section, and a switching speed calculating section.

The display section is configured to display an image.

The display control section is configured to control a display operation of the display section.

The operating point detecting section is configured to detect an operating point where an operator has performed an operation on a display screen of the display section.

The movement information detecting section is configured, when the operating point as an initial point and the operating points forming coordinate points continuous from the initial point are successively detected by the operating point detecting section and the successive detection of the operating points is then stopped, to detect movement information indicating a direction and an amount of movement from the initial point to a stopping point where the successive detection is stopped.

The vector calculating section is configured to divide a vector indicated by the movement information detected by the movement information detecting section into components in predetermined x and y directions and thus calculate the components as respective component vectors in the x and y directions.

The amount-of-value-change calculating section is configured to calculate, from an amount of movement indicated by the component vector in the y direction calculated by the vector calculating section, an amount of numerical value change at each display switch made so that the display control section allows the display section to switch a display from one to another of a plurality of numerical values in succession in increasing or decreasing order.

The switching speed calculating section is configured to calculate, from an amount of movement indicated by the component vector in the x direction calculated by the vector calculating section, a switching speed at each display switch made so that the display control section allows the display section to switch the display from one to another of the plurality of numerical values in succession in the amount of numerical value change.

The display control section is further configured to allow the display section to switch the display from one to another of the plurality of numerical values in succession in the calculated amount of numerical value change and use the calculated switching speed as the switching speed at the display switch from one to another of the plurality of numerical values.

In a computer-readable non-transitory recording medium with a display control program recorded thereon according to another aspect of the present disclosure, the display control program allows a computer to function as the aforementioned display control section, the aforementioned operating point detecting section, the aforementioned movement information detecting section, the aforementioned vector calculating section, the aforementioned amount-of-value-change calculating section, and the aforementioned switching speed calculating section.

DETAILED DESCRIPTION

Figure 1:
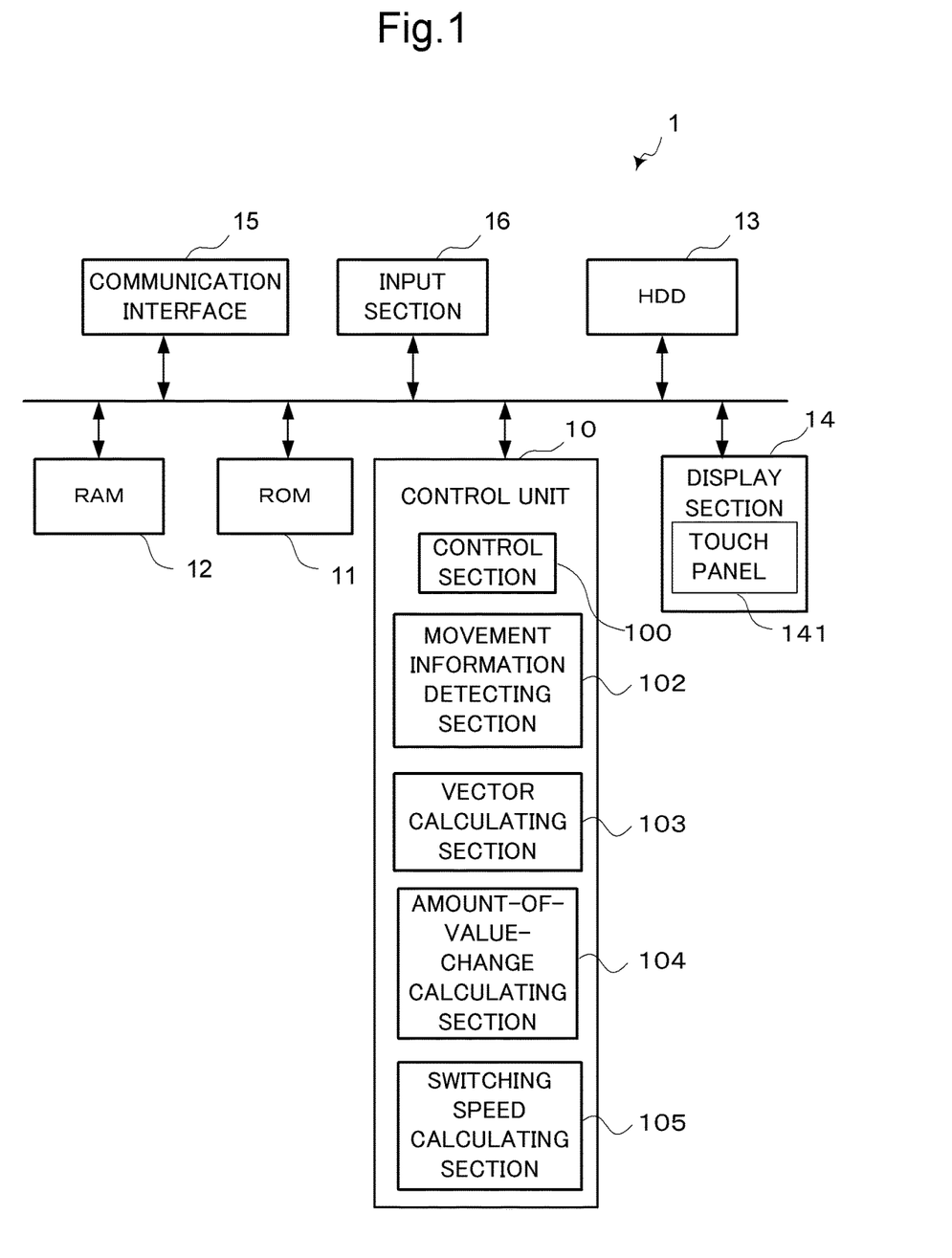
FIG. 1 is a block diagram schematically showing an internal configuration of an information processing apparatus serving as a display apparatus according to one embodiment of the present disclosure.

Hereinafter, a description will be given of a display apparatus, a display control program, and a computer-readable non-transitory recording medium with the display control program recorded thereon, all according to one embodiment of the present disclosure, with reference to the drawings. FIG. 1 is a block diagram schematically showing an internal configuration of an information processing apparatus serving as the display apparatus according to the one embodiment of the present disclosure.

The information processing apparatus 1 serving as the display apparatus according to the one embodiment of the present disclosure includes a control unit 10, a ROM 11, a RAM 12, an HDD 13, a display section 140, a communication interface 15, and an input section 16. These unit and sections can transfer data or signals to and from one another via a CPU bus.

The control unit 10 is formed of a CPU or the like and configured to govern the overall operation of the information processing apparatus 1. The ROM 11 stores an operating program on basic operations of the information processing apparatus 1. The RAM 12 is used as an operating region of the control unit 10 and for other purposes.

The HDD 13 can store, in part of its storage region, various types of data including text data and image data to be printed. The HDD 13 stores a display control program according to the one embodiment of the present disclosure. The control unit 10 operates in accordance with the display control program to function as a control section 100 (only for functions associated with the display control), a movement information detecting section 102, a vector calculating section 103, an amount-of-value-change calculating section 104, and a switching speed calculating section 105. Alternatively, each of the control section 100 (only for functions associated with the display control), the movement information detecting section 102, the vector calculating section 103, the amount-of-value-change calculating section 104, and the switching speed calculating section 105 of the control unit 10 may not be implemented by the operation of the control unit 10 in accordance with the display control program but may be constituted by a hardware circuit. Hereinafter, the same applies to the other embodiments unless otherwise stated.

The display 14 is formed of an LCD (liquid crystal display) or the like and displays contents of various data, and operation guidance and the like for the operator operating the information processing apparatus 1. The communication interface 15 serves as an interface for data communication with multifunction peripherals, personal computers, and so on connected over a network.

The display section 14 is provided with a touch panel 141. The touch panel 141 is provided as a display screen of the display section 14 and configured to detect an operator's touch of the display screen together with a touch point (coordinate point). When detecting the operator's touch, the touch panel 141 outputs a detection signal indicating the touch point to the control section 100, the movement information detecting section 102, and so on. The touch panel 141 encompasses a touch panel operable to detect an operator's finger or the like when the operator's finger or the like, even if not touching the display screen, comes within a certain small distance of the display screen. Therefore, the term "touch" used in this embodiment includes a state where a finger or the like coming within the certain small distance of the display screen is detected, without an actual touch of the display screen, by the function of the touch panel 141, with the consideration of this state as a substantial touch. The "touch point" in this embodiment is an example of the operating point defined in "What is claimed is".

When the operator slides his/her finger on the display screen of the display section 14 while keeping it in touch with the display screen, the touch panel 141 outputs to the control section 100 detection signals indicating a series of points of movement from an initial point at which the touch has been first detected to a latest point at which the touch is last detected. The touch panel 141 is an example of the operating point detecting section defined in "What is claimed is".

The input section 16 is formed of a keyboard, a mouse or the like, through which various operation commands are entered into the information processing apparatus 1 by the operator. For example, a command to print a document is entered on the input section 16.

The control unit 10, as described previously, includes the control section 100, the movement information detecting section 102, the vector calculating section 103, the amount-of-value-change calculating section 104, and the switching speed calculating section 105.

The control section 100 governs the overall operation control of the information processing apparatus 1. The control section 100 is an example of the display control section defined in "What is claimed is".

The movement information detecting section 102 is configured, when a touch point as an initial point and touch points forming coordinate points continuous from the initial point are successively detected by the touch panel 141 and the successive detection of the touch points is then stopped with the detection of a stopping point, to detect movement information indicating a direction and an amount of movement from the initial point to the stopping point based on the detection signals acquired from the touch panel 141.

The vector calculating section 103 is configured to divide a vector indicated by the movement information detected by the movement information detecting section 102 into components in predetermined x and y directions and thus calculate the components as respective component vectors in the x and y directions. The vector calculating section 103 previously stores coordinate information on the display screen of the display section 14 and previously stores a predetermined direction in a region indicated by the coordinates as the x direction and a direction orthogonal to the x direction as the y direction. For example, the y direction is a vertical direction on the display screen of the display section 14 and the x direction is a horizontal direction on the display screen thereof. Specifically, the vector calculating section 103 divides a unidirectional vector indicated by the direction and amount of movement forming the movement information into component vectors in the x and y directions and thus calculate them as an x-component vector and a y-component vector.

The amount-of-value-change calculating section 104 is configured to calculate, from an amount of movement indicated by the y-component vector calculated by the vector calculating section 103, an amount of numerical value change at each display switch made so that the control section 100 allows the display section 14 to switch a display from one to another of a plurality of numerical values in succession in increasing or decreasing order.

The switching speed calculating section 105 is configured to calculate, from an amount of movement indicated by the x-component vector calculated by the vector calculating section 103, a switching speed at each display switch made so that the control section 100 allows the display section 14 to switch the display from one to another of the plurality of numerical values in succession in the calculated amount of numerical value change.

Note that the above reference signs x and y used for the x direction, the y direction, the x component, and the y component are merely for the purpose of indicating two directions in dividing a single vector into two components. In other words, which of two directions should be used as the x or y direction is not specified. For example, in this embodiment, the amount-of-value-change calculating section 104 and the switching speed calculating section 105 may be configured to perform the above calculations based on the x-component vector and the y-component vector, respectively.

The control section 100 is configured to serve as the display control section defined in "What is claimed is" to control a display operation of the display section 14. The control section 100 is further configured to allow the display section 14 to switch the display from one to another of the plurality of numerical values in succession in increasing or decreasing order. Specifically, the control section 100 is configured to allow the display section 14 to switch the display from one to another of the numerical values as display objects in succession in the amount of numerical value change calculated by the amount-of-value-change calculating section 104, using the switching speed calculated by the switching speed calculating section 105 as the switching speed at the display switch from one to another of the numerical values.

For example, when, in displaying one after another of numerical values of 0 to 1000, the control section 100 switches the numerical display in increments of 1, like 0→1→2→3→ . . . →998→999→1000, the amount of numerical value change is 1.

For another example, when, in displaying one after another of numerical values of 0 to 1000, the control section 100 switches the numerical display in increments of 10, like 0→10→20→ . . . →980→990→1000, the amount of numerical value change is 10.

The switching speed used herein refers to the time taken, when the control section 100 switches the display from one to another of a plurality of numerical values in succession in the amount of numerical value change, to change from the value just displayed to the next value to be displayed, in other words, a display period during which one of the plurality of numerical values as display objects is displayed.

Figure 2:
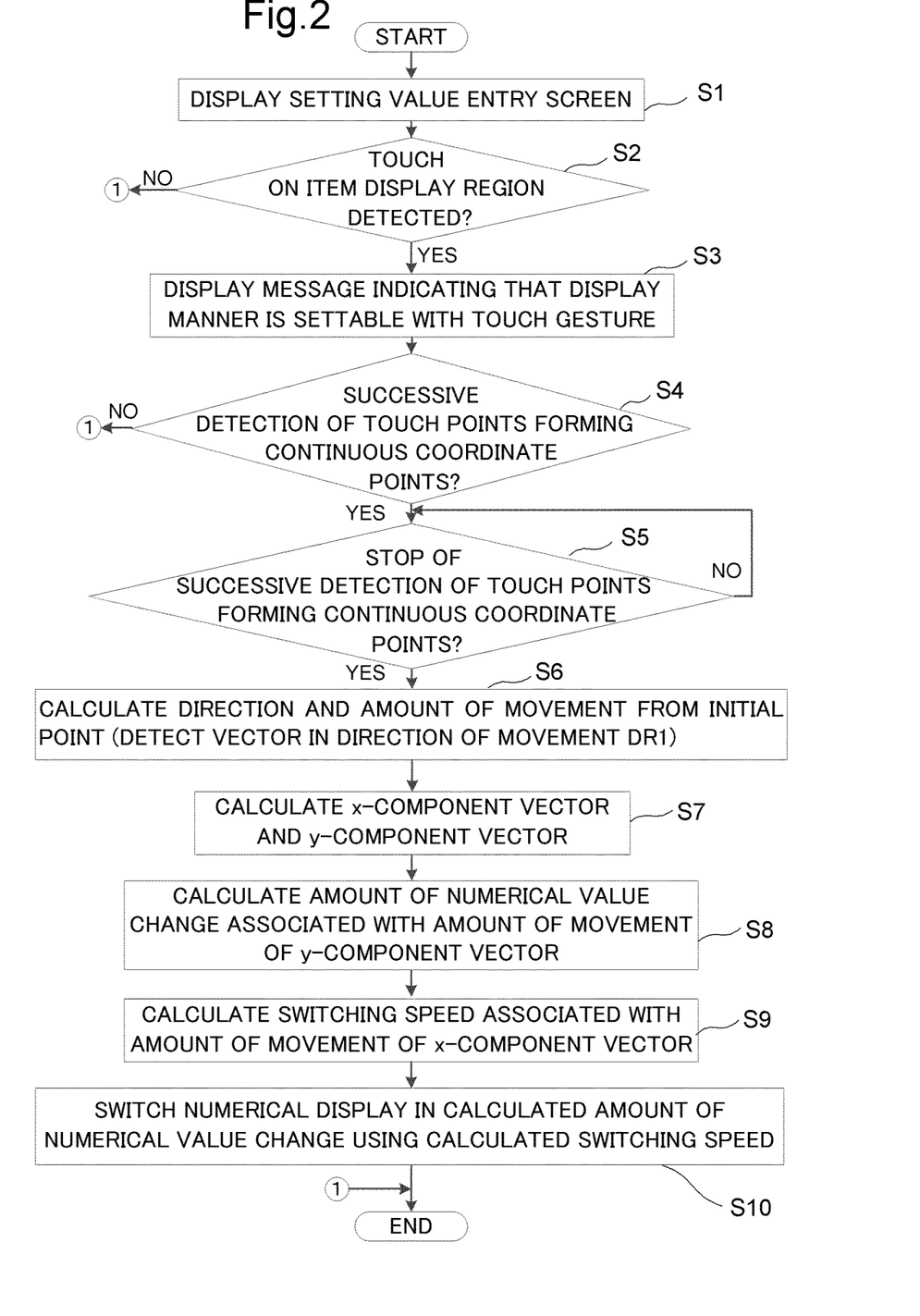
FIG. 2 is a flowchart showing a first embodiment of display control in the information processing apparatus.
Figure 3:
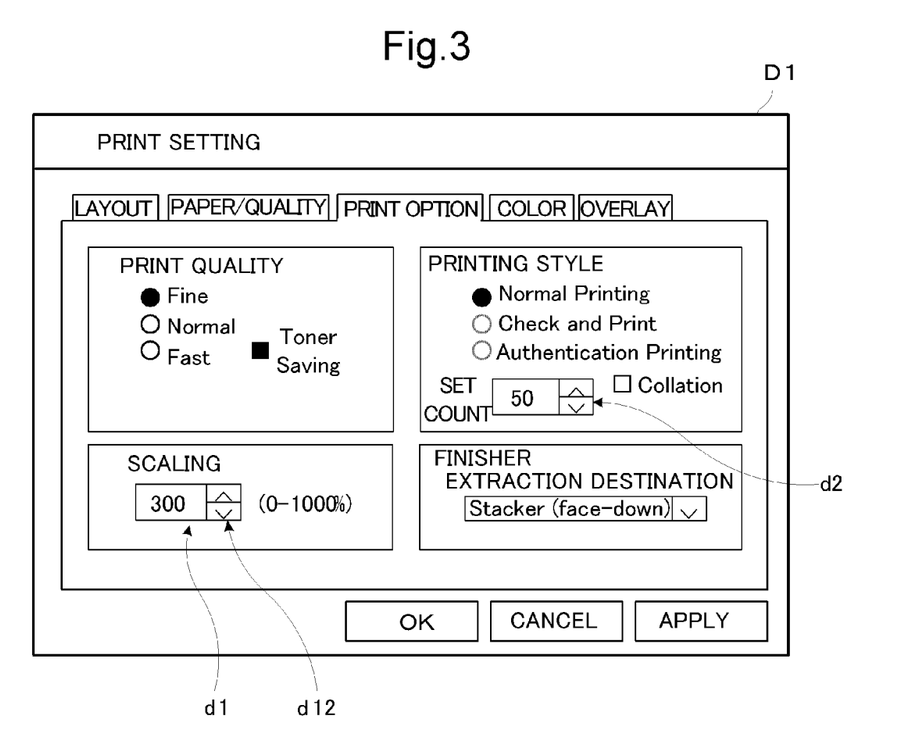
FIG. 3 is a view showing an example of a display screen of a display section.

Next, a description will be given of a first embodiment of display control over the display section 14 in the information processing apparatus 1. FIG. 2 is a flowchart showing the first embodiment of display control in the information processing apparatus 1. FIG. 3 is a view showing an example of a display screen of the display section 14.

When, with a word processor or like software run on the information processing apparatus 1, the operator enters a command to print a document on the input section 16, the control section 100 runs a printer driver based on this print command. The display section 14 displays, under the display control of the control section 100, a print setting screen D1 as shown in FIG. 3 (S1).

This print setting screen D1 includes a scaling factor setting image display region d1 for use in specifying the scaling factor of a print image and/or a set count setting image display region d2 for use in specifying the number of copy sets. The scaling factor setting image display region d1 displays an image for use in receiving from the operator entry of an enlargement or reduction factor as a setting value for the function of scaling a print image which is one of operable functions possessed by the information processing apparatus 1. The set count setting image display region d2 displays an image for use in receiving from the operator entry of a setting value for the function of setting the number of copy sets which is also one of operable functions possessed by the information processing apparatus 1. In other words, the print setting screen D1 is a setting value entry screen for use in receiving entry of setting values for these functions.

When, with the print setting screen D1 displayed on the display section 14, the operator touches, for example, the scaling factor setting image display region d1 with his/her finger, the touch panel 141 detects a coordinate point on the display screen corresponding to the operator's touch point. If the detected coordinate point coincides with a coordinate point previously stored as the coordinate point of the scaling factor setting image display region d1, the control section 100 detects that the operator has touched the scaling factor setting image display region d1.

Figure 4:
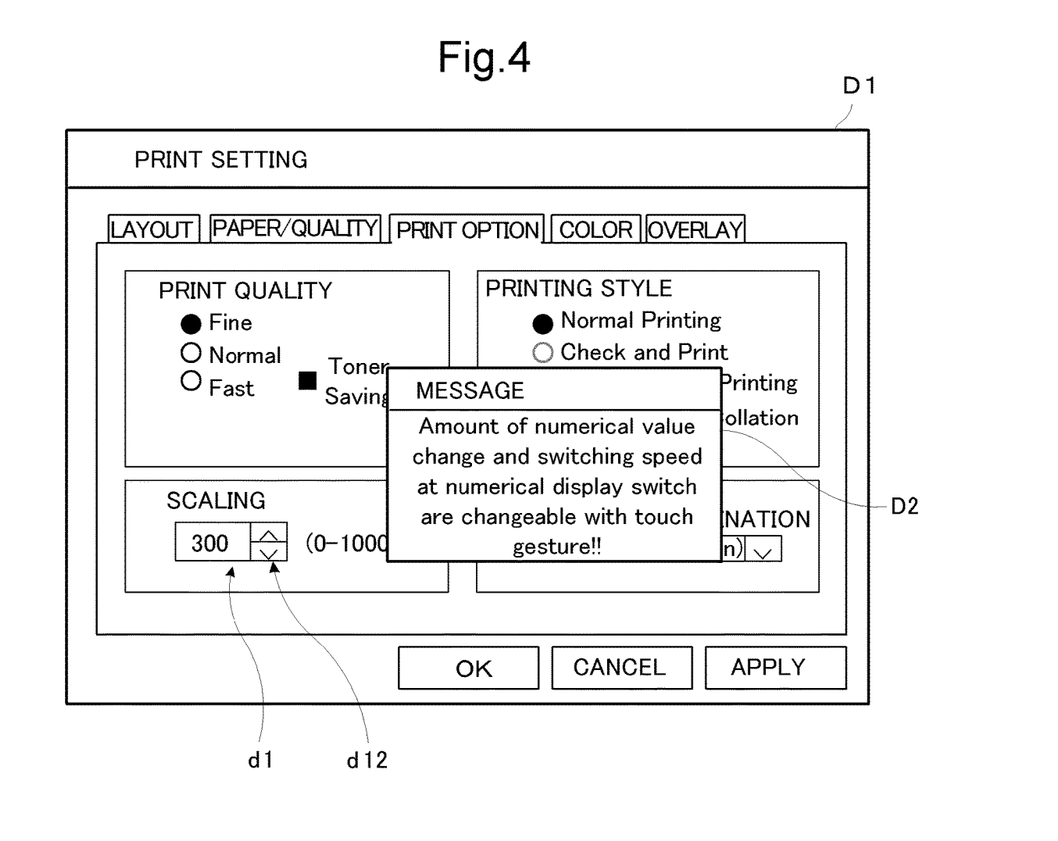
FIG. 4 is a view showing an example of the display screen of the display section.

When the operator's touch of a region displaying an image for receiving entry of a setting value for a function (the scaling factor setting image display region d1 in this case) has been detected in the above manner (YES in S2), the control section 100 allows the display section 14 to display a message indicating that the amount of numerical value change and the switching speed in switching a numerical display representing the setting value can be set with an operator's touch of the display screen (S3). For example, the control section 100 allows the display section 14 to display a message screen D2 in the form of a popup window, as shown as an example in FIG. 4, on the print setting screen D1. The control section 100 allows the display section 14 to stop the display of the message screen D2 after the lapse of a predetermined time (for example, five seconds). If NO in S2, the process ends.

Meanwhile, the movement information detecting section 102 stores as an initial point the coordinate point of the touch detected in S2. Then, when the operator slides his/her finger placed on the initial point in any direction while keeping it in touch with the display screen of the display section 14, the touch panel 141 outputs, to the movement information detecting section 102, respective detection signals indicating touch points changing with time according to the finger's movement.

The movement information detecting section 102 determines whether the coordinate points corresponding to the touch points indicated by the detection signals acquired from the touch panel 141 are coordinate points continuous (connected in series) from the initial point (S4). If NO in S4, the process ends.

While it is successively determined that the coordinate points corresponding to the touch points indicated by the detection signals are such continuous coordinate points as described above (YES in S4), the movement information detecting section 102 continues to determine whether the receipt of detection signals indicating the above continuous coordinate points is continued (NO in S5).

When the receipt of detection signals indicating the above continuous coordinate points is terminated, i.e., if the movement information detecting section 102 determines that the detection of touch points indicating the above coordinate points continuous from the initial point has finished (YES in S5), responding that the operator has stopped the sliding of his/her finger from the initial point, the movement information detecting section 102 detects the direction and amount of movement from the initial point to a stopping point which is the last touch point where the sliding has been stopped, based on the coordinate points corresponding to the initial and stopping points indicated by the detection signals (S6).

Figure 5:
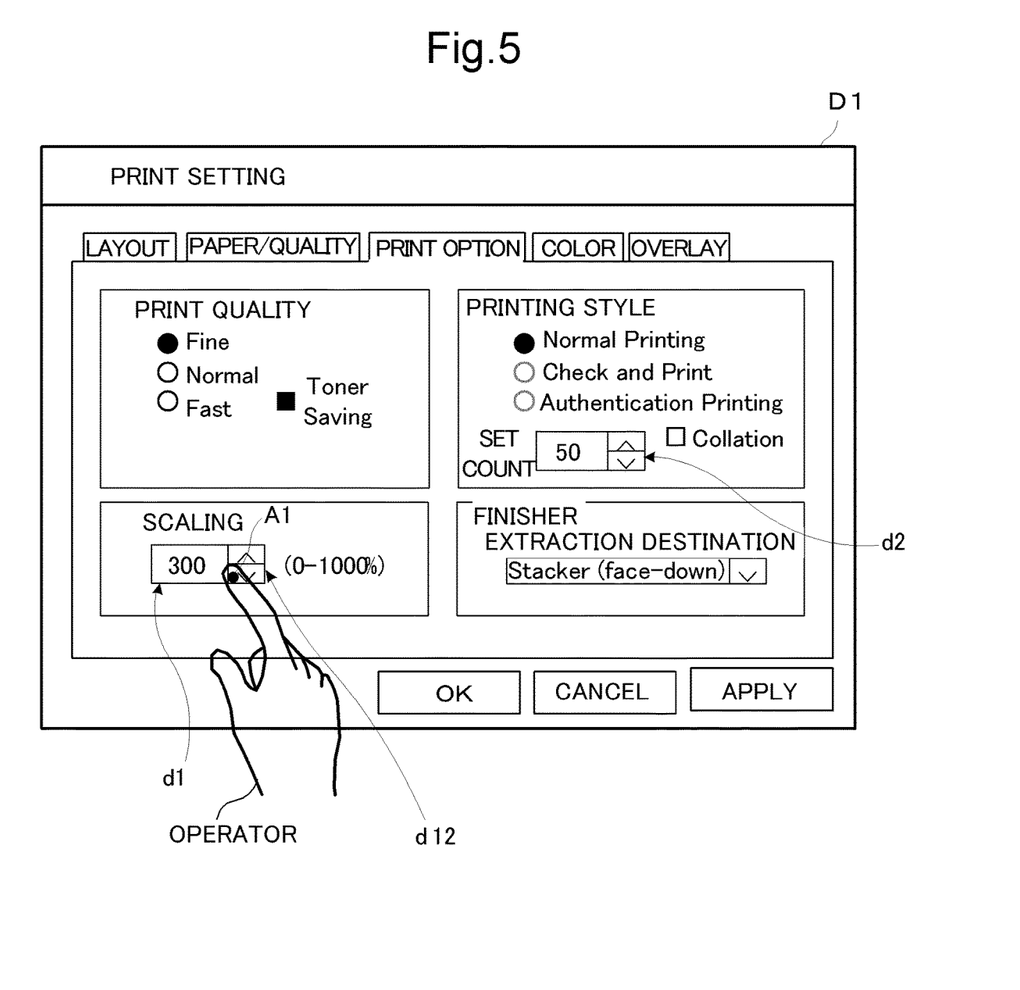
FIG. 5 is a view showing a state where an operator touches a scaling factor setting image display region with his/her finger.

The process up to this point will be described below in association with the operations of the operator. For example, when, as shown in FIG. 5, the operator touches, with his/her index finger, the scaling factor setting image display region d1 of the print setting screen D1 displayed on the display section 14, the movement information detecting section 102 stores the touch point as an initial point A1.

Figure 6:
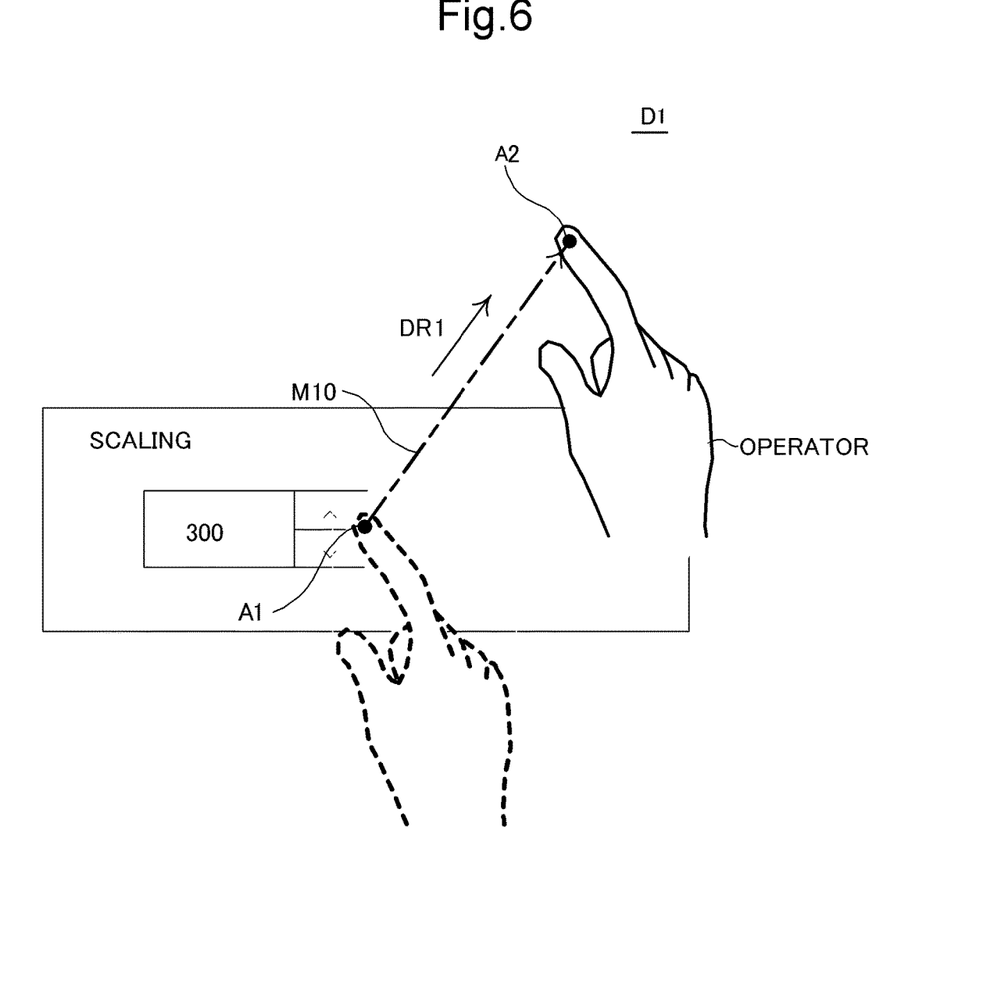
FIG. 6 is a view showing how the operator slides his/her finger on the display screen.

Subsequently, when, as shown in FIG. 6, the operator slides his/her index finger from the initial point A1 and stops the sliding movement at a certain point A2, the movement information detecting section 102 stores a coordinate point corresponding to the point A2 as a stopping point A2 and calculates the amount of movement M10 from the initial point A1 to the stopping point A2. The movement information detecting section 102 further calculates the direction of movement DR1 from the initial point A1 toward the stopping point A2. Thus, the movement information detecting section 102 detects a vector having an energy made of the amount of movement M10 in the direction of movement DR1.

Next, the vector calculating section 103 divides the detected vector into components in the x and y directions and thus calculates them as an x-component vector and a y-component vector (S7). If the detected vector has only one of x and y components, only a vector of the one component is calculated and the after-mentioned amount of movement for the other component vector is considered to be null.

Subsequently, the amount-of-value-change calculating section 104 calculates an amount of numerical value change according to the amount of movement (the magnitude of energy) indicated by the y-component vector calculated in S7 (S8). The amount-of-value-change calculating section 104 previously stores, for example, various amounts of movement and their associated amounts of numerical value change in a correspondence relation in the form of a data table. The amount-of-value-change calculating section 104 calculates the amount of numerical value change by reading this value associated with the calculated amount of movement from the data table. Alternatively, the amount-of-value-change calculating section 104 may previously store respective factors associated with the various amounts of movement and calculate the amount of numerical value change using the factor associated with the detected amount of movement.

The amount-of-value-change calculating section 104 calculates the amount of numerical value change in proportion to a change in the amount of movement indicated by the y-component vector. In other words, the amount-of-value-change calculating section 104 increases the amount of numerical value change with increasing amount of movement and decreases the amount of numerical value change with decreasing amount of movement.

Figure 7:
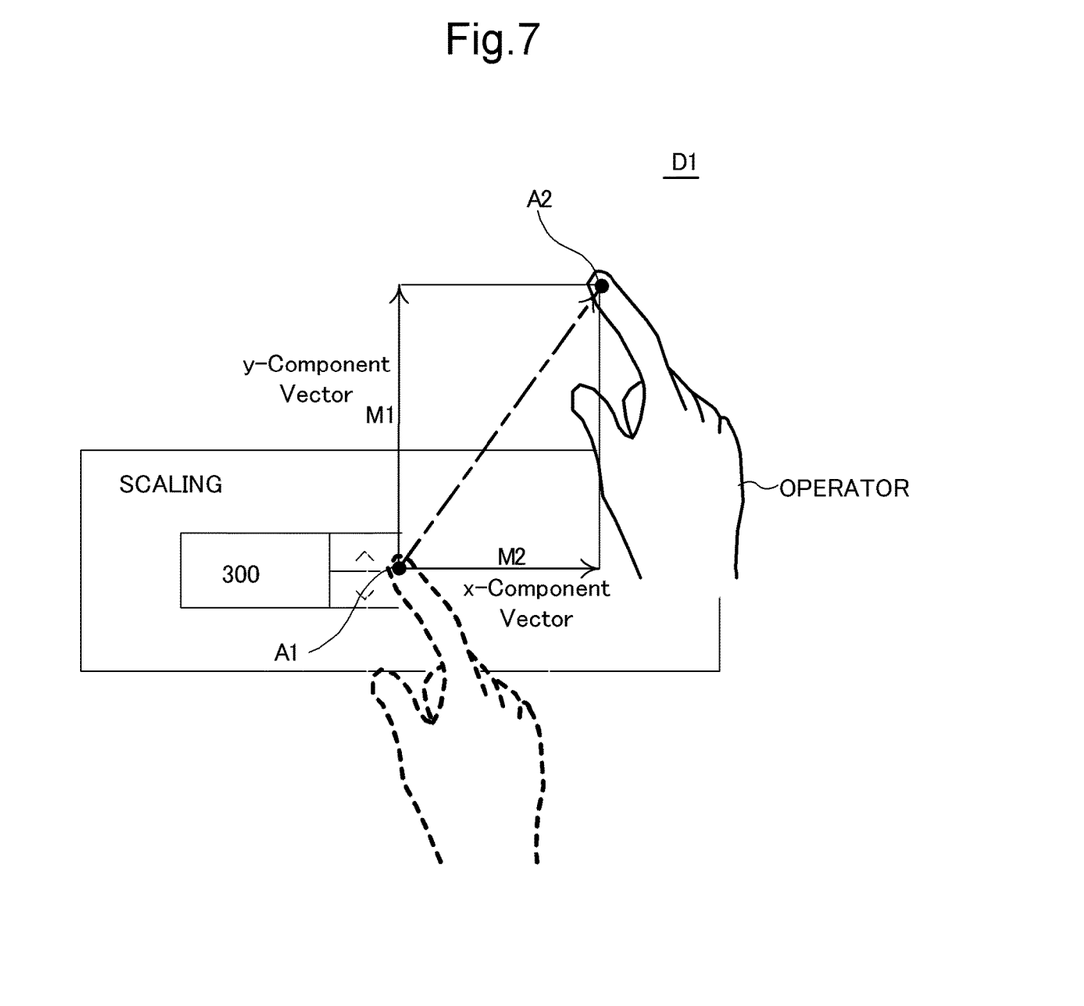
FIG. 7 is a view showing a state where a vector indicated by second movement information is divided into an x-component vector and a y-component vector.

For example, as has been described with reference to FIG. 6, when the movement information detecting section 102 detects a vector made of a direction of movement DR1 and an amount of movement M10 from the initial point A1 to the stopping point A2, the vector calculating section 103, as shown in FIG. 7, divides the vector into an x-component vector in the x direction and a y-component vector in the y direction. The amount-of-value-change calculating section 104 calculates an amount of numerical value change associated with an amount of movement M1 indicated by the y-component vector (an energy indicated by the y-component vector), which is one of the above two component vectors.

Figure 8A:
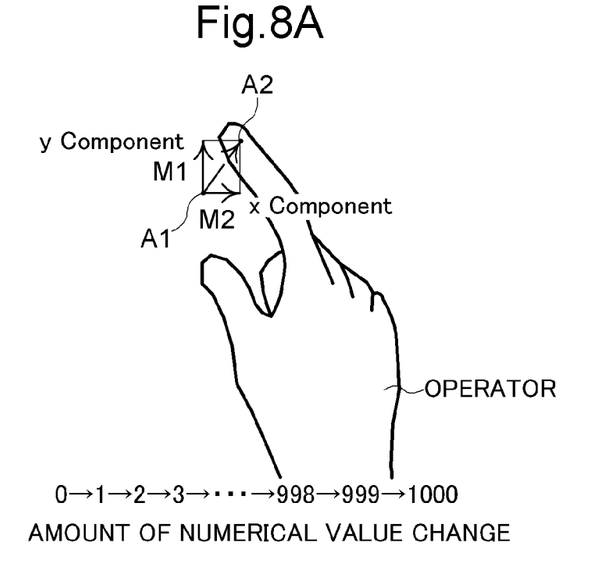
FIGS. 8A and 8B are views showing an operator's finger having slid in different amounts of sliding movement.

For example, if as shown in FIG. 8A the amount of movement of the finger slid from the initial point A1 in the y direction by the operator is small, so that the amount of movement M1 indicated by the y-component vector is small (for example, one-tenth of an after-mentioned amount of movement M110), the amount-of-value-change calculating section 104 calculates an amount of numerical value change so that the control section 100 can switch the numerical display from one to another of numerical values in increments of 1, like 0→1→2→3→ . . . →998→999→1000.

Figure 8B:
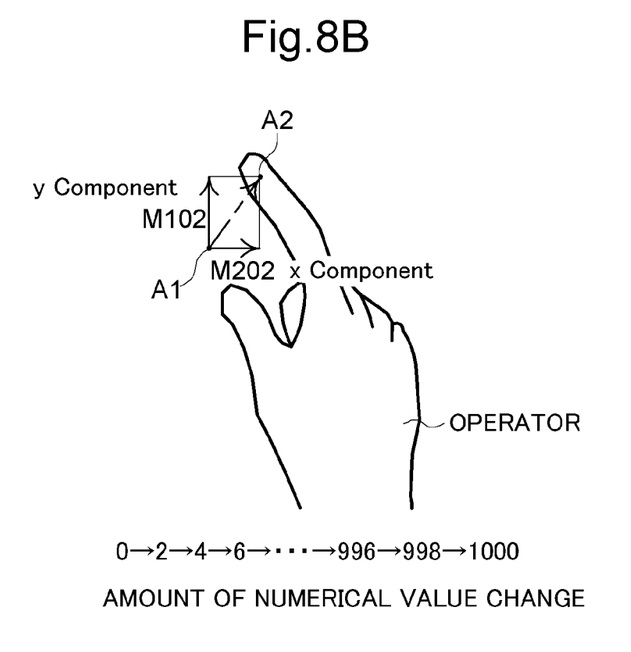

Alternatively, if as shown in FIG. 8B the amount of movement indicated by the y-component vector is an amount of movement M102 greater than the amount of movement M1 (for example, twice the amount of movement M1), the amount-of-value-change calculating section 104 calculates an amount of numerical value change so that the control section 100 can switch the numerical display from one to another of the numerical values in increments of 2, like 0→2→4→6→ . . . →996→998→1000.

Figure 9:
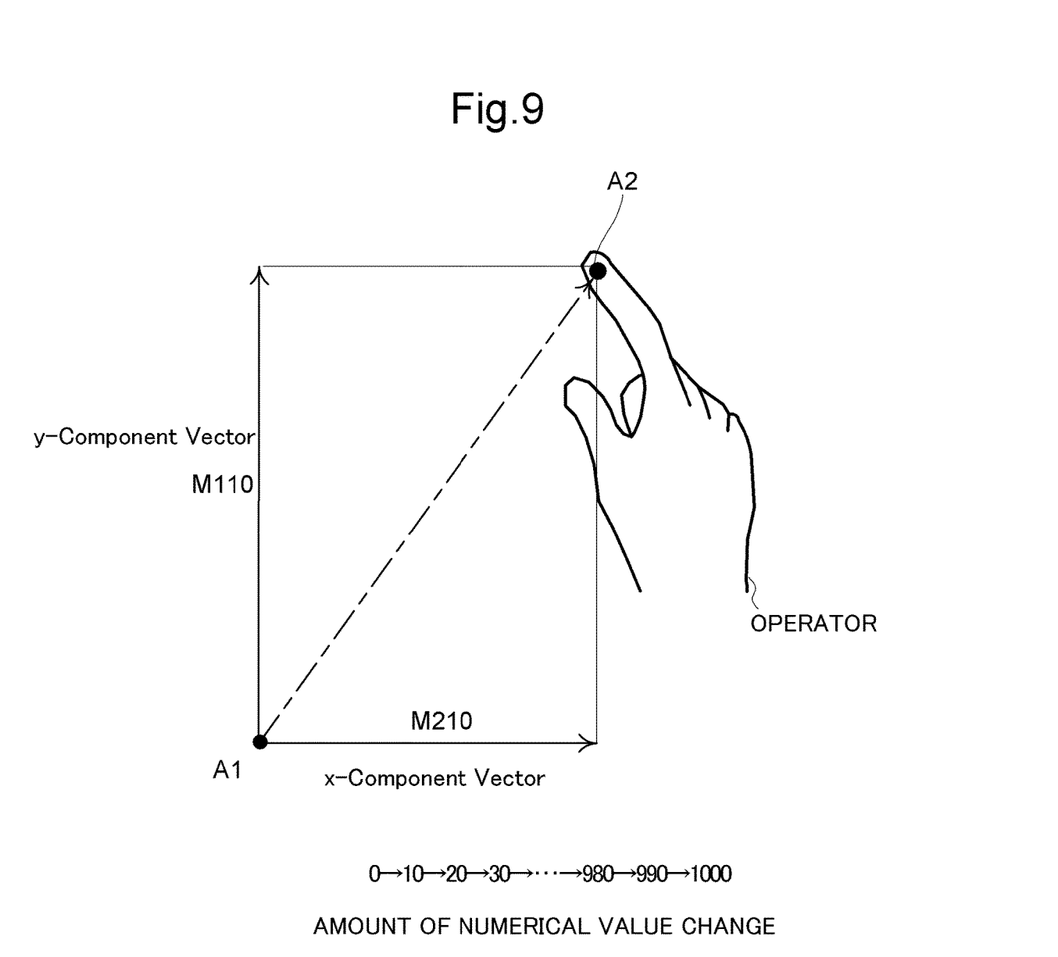
FIG. 9 is a view showing the operator's finger having slid in another different amount of sliding movement.

Still alternatively, if as shown in FIG. 9 the amount of movement indicated by the y-component vector is an amount of movement M110 much greater than the amount of movement M1 (for example, ten times the amount of movement M1), the amount-of-value-change calculating section 104 calculates an amount of numerical value change so that the control section 100 can switch the numerical display from one to another of the numerical values in increments of 10, like 0→10→20→30→ . . . →980→990→1000.

Subsequently, the switching speed calculating section 105 calculates, according to an amount of movement M2 indicated by the x-component vector (an energy of the x-component vector) calculated in S7, a switching speed at each display switch made so that the control section 100 allows the display section 14 to switch the numerical display from one to another of the numerical values in succession in the calculated amount of numerical value change (S9). The switching speed calculating section 105 previously stores, for example, various amounts of movement and their associated switching speeds in a correspondence relation in the form of a data table. The switching speed calculating section 105 calculates the switching speed by reading this value associated with the calculated amount of movement from the data table. Alternatively, the switching speed calculating section 105 may previously store respective factors associated with the various amounts of movement and calculate the switching speed using the factor associated with the detected amount of movement.

For example, if as shown in FIG. 8A the amount of movement of the finger slid from the initial point A1 in the x direction by the operator is small, so that the amount of movement M2 indicated by the x-component vector is small (for example, one-tenth of an after-mentioned amount of movement M210), the switching speed calculating section 105 calculates a switching speed so that the control section 100 can switch the numerical display every n seconds.

Alternatively, if as shown in FIG. 8B the x-component vector indicates an amount of movement M202 greater than the amount of movement M2 (for example, twice the amount of movement M2), the switching speed calculating section 105 calculates a switching speed so that the control section 100 can switch the numerical display every 2 n seconds.

Still alternatively, if as shown in FIG. 9 the x-component vector indicates an amount of movement M210 much greater than the amount of movement M2 (for example, ten times the amount of movement M2), the switching speed calculating section 105 calculates a switching speed so that the control section 100 can switch the numerical display every 10 n seconds.

Thus, by adjusting the amount and direction of sliding movement when the operator slides his/her finger in touch with the display screen of the display section 14, the amount (width) of numerical value change in switching the numerical display in the scaling factor setting image display region d1 from a numerical value being currently displayed to the next numerical value to be displayed can be set at a desired value and the speed (period) for switching the numerical display in the scaling factor setting image display region d1 from the numerical value being displayed to the next numerical value to be displayed can be set at a desired value.

Furthermore, by adjusting the direction and amount (distance) of sliding movement of the operator's finger from the initial point, the respective amounts of movement emerging as respective energies of the y-component vector and the x-component vector and defining the amount of numerical value change and the switching speed can be changed. Therefore, the operator can set a desired amount of numerical value change and a desired switching speed with a single slide on the display screen of the display section 14.

Thereafter, when the touch panel 141 detects an operator's touch of a numerical value display portion d11 or a pull-up/pull-down key image d12 of the scaling factor setting image display region d1, the control section 100 allows the display section 14 to switch the display from one to another of a plurality of numerical values as display objects in succession using the amount of numerical value change calculated in S8 and the switching speed calculated in S9 (S10).

Thus, the operator can adjust both the amount of numerical value change and the switching speed of numerical values to be switchably displayed as candidates for a setting value on the display section 14 by touching the display screen of the display section 14 with his/her finger and sliding the finger in a single direction on the display screen to adjust the distance and direction of the sliding movement.

The operator can easily make, with a simple slide of his/her finger on the display screen, adjustments such as increasing the switching speed to quickly reach the display of a desired numerical value when numerical values are displayed one after another in increments of 1 or decreasing the switching speed to make transition of numerical values displayed more visible when the numerical values are displayed one after another in increments of 10.

Since the operator can change, with a movement of his/her finger in a single direction, both the amount of numerical value change and the switching speed when numerical values are displayed one after another, the setting change of the amount of numerical value change and the switching speed can be made more efficiently than when it is made by running a special program as is conventionally done.

In a general display apparatus, in order to increase the operator's visibility and operability when its display section switches the display from one to another of numerical values indicating candidates for a setting value in succession, it is preferred that the operator could change, as appropriate, the amount (width) of numerical value change at the display switch and could also change, as appropriate, the speed at the display switch. Furthermore, the operation in changing the amount of numerical value change and the switching speed should preferably be easy for the operator. In this embodiment, the amount of numerical value change and the display switching speed of numerical values to be displayed one after another, on the display section 14, as candidates for a setting value for a function operable on the apparatus can be changed with a simple operation of the operator.

Figure 10:
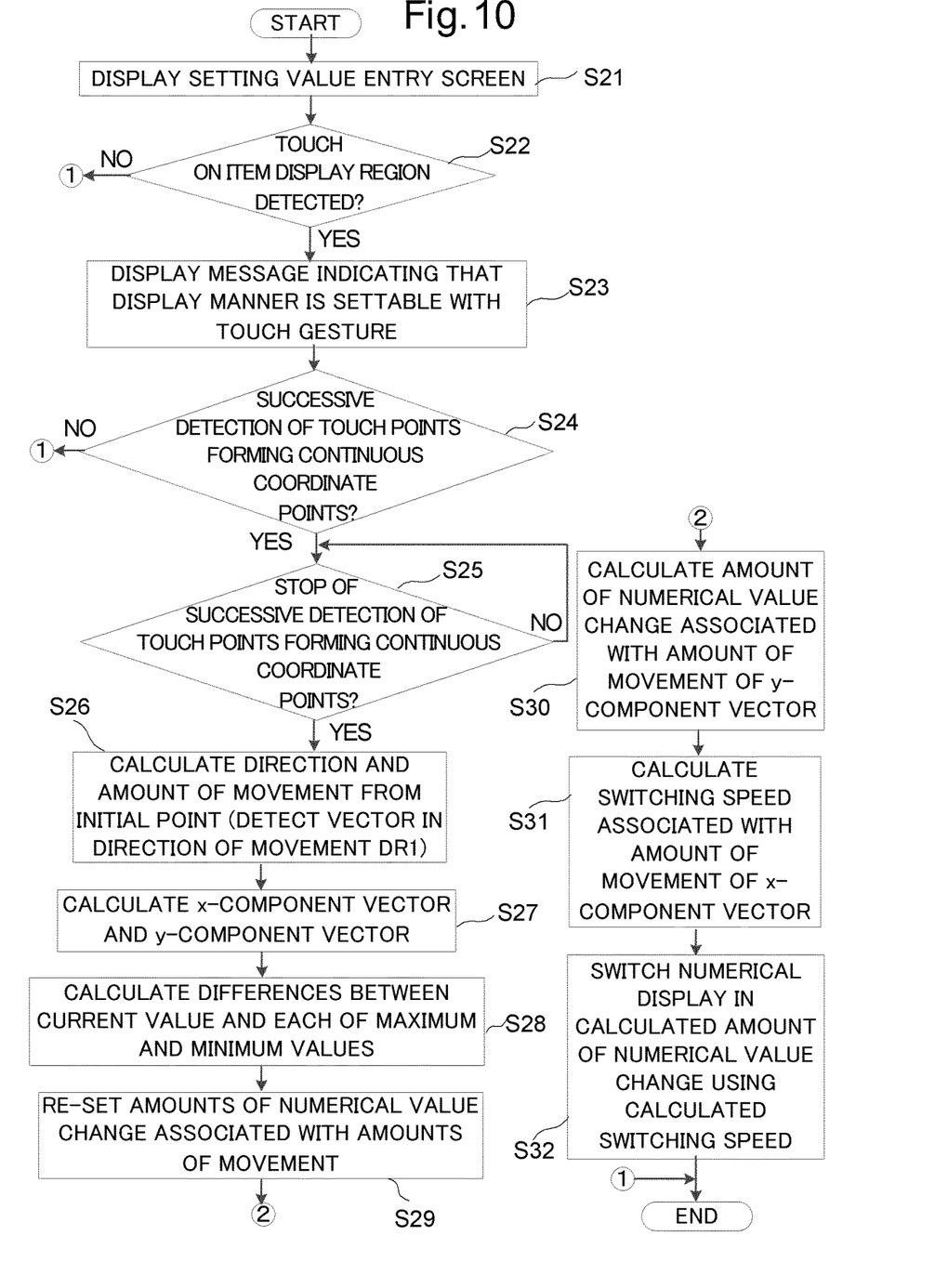
FIG. 10 is a flowchart showing a second embodiment of display control in the information processing apparatus.

Next, a description will be given of a second embodiment of display control in the information processing apparatus 1. FIG. 10 is a flowchart showing the second embodiment of display control in the information processing apparatus 1. Further description of the same pieces of processing as those in the first embodiment shown in FIG. 2 will be omitted.

In the second embodiment, when the movement information detecting section 102 determines that the detection of touch points indicating coordinate points continuous from the initial point has finished (YES in S25) and detects a vector indicated by the direction and amount of movement from the initial point to the stopping point (S26) and the vector calculating section 103 calculates from the detected vector an x-component vector and a y-component vector (S27), the amount-of-value-change calculating section 104 calculates a difference between a current value which is a numerical value being displayed at this point in time (a numerical value which the control section 100 allows the display section 14 to display at the time of detection of the initial point in S22) and a maximum value assignable as a setting value and a difference between the current value and a minimum value assignable as a setting value (S28).

Then, the amount-of-value-change calculating section 104 re-sets, depending upon the calculated difference, the respective amounts of numerical value change associated with the various amounts of movement (S29).

For example, suppose that the range of numerical values assignable as a setting value is 0 to 1000 as described previously. When in this case one or both of the absolute values of the differences between the current value and each of the maximum and minimum values (hereinafter referred to simply as "differences") are equal to or greater than a predetermined value, for example, 500, the amount-of-value-change calculating section 104 retains the amounts of numerical value change associated with the amounts of movement stored in the data table, insofar as the amounts of movement is concerned with, in two directions toward the maximum and minimum values, one or both directions leading to the difference equal to or greater than the predetermined value.

On the other hand, when one of the differences is smaller than 500, the amount-of-value-change calculating section 104 re-sets the amounts of numerical value change associated with the amounts of movement stored in the data table by changing the amounts of numerical value change according to the value representing the difference, i.e., the ratio of the value representing the difference to 500, insofar as the amounts of movement is concerned with, in the two directions toward the maximum and minimum values, one direction leading to the difference smaller than the predetermined value. For example, the amounts of numerical value change associated with the amounts of movement are decreased as the above ratio is greater.

Thereafter, the amount-of-value-change calculating section 104 calculates an amount of numerical value change according to the amount of movement indicated by the y-component vector calculated in S27, based on the data table containing the re-set amounts of numerical value change (S30). The calculation of the switching speed according to the amount of movement of the x-component vector and the display control using the calculated amount of numerical value change and switching speed are performed in the same manner as in the first embodiment.

Thus, when the remaining group of numerical values (the number of remaining numerical values) assignable as a setting value is small, it is possible to restrict the amount of numerical value change at the numerical display switch, calculated according to the amount of movement indicated by the x-component vector, thus providing a numerical display making it easy for the operator to find a desired value in a small number of remaining candidate numerical values for the setting value.

Also when the remaining group of numerical values (the number of remaining numerical values) assignable as a setting value is large, the amount-of-value-change calculating section 104 may re-set the amounts of numerical value change associated with the amounts of movement stored in the data table by changing the amounts of numerical value change according to the value representing the aforementioned difference, i.e., the ratio of the value representing the difference from 500 with respect to 500. For example, the amount-of-value-change calculating section 104 increases the amounts of numerical value change associated with the amounts of movement as the above ratio is smaller.

The present disclosure is not limited to the configurations of the above embodiment and can include various modifications. For example, although in the above embodiments the information processing apparatus 1 as typified by a personal computer has been described as one embodiment of the display apparatus according to the present disclosure, the present disclosure is not limited to this. The present disclosure is applicable to various types of equipment as display apparatus with a display section having a touch panel function, such as smartphones, mobile devices, and image forming apparatuses.

The configurations and processing shown in the above embodiments with reference to FIGS. 1 to 10 are merely illustrative of the present disclosure and the present disclosure is not intended to be limited to these configurations and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A display apparatus comprising:
a display section configured to display an image;
a display control section configured to control a display operation of the display section;
an operating point detecting section configured to detect an operating point where an operator has performed an operation on a display screen of the display section;
a movement information detecting section configured, when the operating point as an initial point and the operating points forming coordinate points continuous from the initial point are successively detected by the operating point detecting section and the successive detection of the operating points is then stopped, to detect movement information indicating a direction and an amount of movement from the initial point to a stopping point where the successive detection is stopped;
a vector calculating section configured to divide a vector indicated by the movement information detected by the movement information detecting section into components in predetermined x and y directions and thus calculate the components as respective component vectors in the x and y directions;
an amount-of-value-change calculating section configured to calculate, from an amount of movement indicated by the component vector in the y direction calculated by the vector calculating section, a predetermined increment used as an amount of numerical value change at each display switch so that the display control section allows the display section to switch a display from one to another of a plurality of numerical values in succession in increasing or decreasing order; and
a switching speed calculating section configured to calculate, from an amount of movement indicated by the component vector in the x direction calculated by the vector calculating section, a display period of each of the plurality of numerical values used as a switching speed at each display switch so that the display control section allows the display section to switch the display from one to another of the plurality of numerical values in the amount of numerical value change,
wherein the display control section is further configured to allow the display section to switch the display from one to another of the plurality of numerical values in succession in the calculated amount of numerical value change and use the calculated switching speed as the switching speed at the display switch from one to another of the plurality of numerical values.

2. The display apparatus according to claim 1, wherein the amount-of-value-change calculating section is configured to calculate the amount of numerical value change to be greater as the amount of movement detected by the movement information detecting section is greater.

3. The display apparatus according to claim 1, wherein the switching speed calculating section is configured to calculate the switching speed to be higher as the detected amount of movement is greater.

4. The display apparatus according to claim 1, wherein the amount-of-value-change calculating section is configured to calculate the amount of numerical value change by changing the amount of numerical value change according to a number of remaining numerical values from a start value at the start of the display switch to a limit value set as a displayable limit of the plurality of numerical values.

5. A display apparatus comprising:
a display section configured to display an image;
a display control section configured to control a display operation of the display section;
an operating point detecting section configured to detect an operating point where an operator has performed an operation on a display screen of the display section;
a movement information detecting section configured, when the operating point as an initial point and the operating points forming coordinate points continuous from the initial point are successively detected by the operating point detecting section and the successive detection of the operating points is then stopped, to detect movement information indicating a direction and an amount of movement from the initial point to a stopping point where the successive detection is stopped;
a vector calculating section configured to divide a vector indicated by the movement information detected by the movement information detecting section into components in predetermined x and y directions and thus calculate the components as respective component vectors in the x and y directions;

an amount-of-value-change calculating section configured to calculate, from an amount of movement indicated by the component vector in the y direction calculated by the vector calculating section, an amount of numerical value change at each display switch made so that the display control section allows the display section to switch a display from one to another of a plurality of numerical values in succession in increasing or decreasing order; and a switching speed calculating section configured to calculate, from an amount of movement indicated by the component vector in the x direction calculated by the vector calculating section, a switching speed at each display switch made so that the display control section allows the display section to switch the display from one to another of the plurality of numerical values in the amount of numerical value change, wherein the display control section is further configured to allow the display section to switch the display from one to another of the plurality of numerical values in succession in the calculated amount of numerical value change and use the calculated switching speed as the switching speed at the display switch from one to another of the plurality of numerical values, and the amount-of-value-change calculating section is configured to calculate the amount of numerical value change by changing the amount of numerical value change according to a number of remaining numerical values from a start value at the start of the display switch to a limit value set as a displayable limit of the plurality of numerical values, and change the amount of numerical value change associated with the amount of movement concerned with a direction toward the limit value according to a ratio of an absolute value of a difference between the start value at the start of the display switch and the limit value to the limit value.

6. The display apparatus according to claim 5, wherein when the number of remaining numerical values is smaller than a predetermined value, the amount-of-value-change calculating section calculates the amount of numerical value change associated with the amount of movement concerned with the direction toward the limit value by changing the amount of numerical value change to be smaller as the ratio is greater.

7. The display apparatus according to claim 5, wherein when the number of remaining numerical values is equal to or greater than the predetermined value, the amount-of-value-change calculating section calculates the amount of numerical value change associated with the amount of movement concerned with the direction toward the limit value by changing the amount of numerical value change to be greater as the ratio is smaller.

8. A computer-readable non-transitory recording medium with a display control program recorded thereon, the display control program allowing a computer to function as:

a display control section configured to control a display operation of a display section;

an operating point detecting section configured to detect an operating point where an operator has performed an operation on a display screen of the display section;

a movement information detecting section configured, when the operating point as an initial point and the operating points forming coordinate points continuous from the initial point are successively detected by the operating point detecting section and the successive detection of the operating points is then stopped, to detect movement information indicating a direction and an amount of movement from the initial point to a stopping point where the successive detection is stopped;

a vector calculating section configured to divide a vector indicated by the movement information detected by the movement information detecting section into components in predetermined x and y directions and thus calculate the components as respective component vectors in the x and y directions;

an amount-of-value-change calculating section configured to calculate, from an amount of movement indicated by the component vector in the y direction calculated by the vector calculating section, an amount of numerical value change at each display switch made so that the display control section allows the display section to switch a display from one to another of a plurality of numerical values in succession in increasing or decreasing order; and a switching speed calculating section configured to calculate, from an amount of movement indicated by the component vector in the x direction calculated by the vector calculating section, a switching speed at each display switch made so that the display control section allows the display section to switch the display from one to another of the plurality of numerical values in the amount of numerical value change, wherein the display control program further allows the computer to function so that:

the display control section allows the display section to switch the display from one to another of the plurality of numerical values in succession in the calculated amount of numerical value change and use the calculated switching speed as the switching speed at the display switch from one to another of the plurality of numerical values, and the amount-of-value-change calculating section calculates the amount of numerical value change by changing the amount of numerical value change according to a number of remaining numerical values from a start value at the start of the display switch to a limit value set as a displayable limit of the plurality of numerical values, and changes the amount of numerical value change associated with the amount of movement concerned with a direction toward the limit value according to a ratio of an absolute value of a difference between the start value at the start of the display switch and the limit value to the limit value.

\* \* \* \* \*